April 19, 1938.    M. LARSSON    2,114,600
MANUFACTURE OF DICALCIUM PHOSPHATE AND ALKALI SALTS
Filed Dec. 18, 1934
PROCESS FOR THE MANUFACTURE OF DICALCIUM PHOSPHATE AND ALKALI SALTS
(IN MOLECULES)
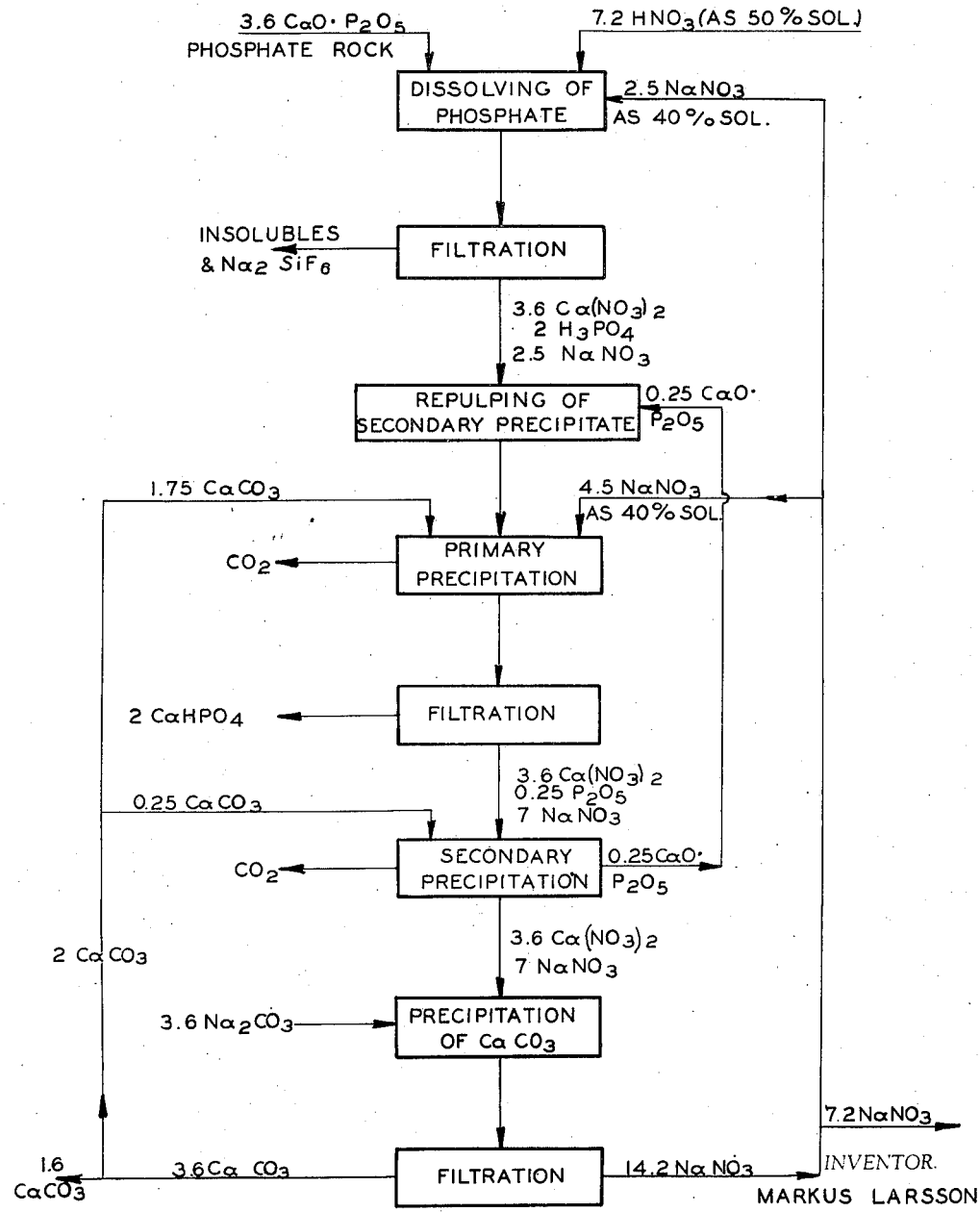
INVENTOR.
MARKUS LARSSON
BY Arthur Middleton
ATTORNEY.

Patented Apr. 19, 1938

2,114,600

UNITED STATES PATENT OFFICE 2,114,600

MANUFACTURE OF DICALCIUM PHOSPHATE AND ALKALI SALTS

Markus Larsson, Berlin, Germany, assignor to Kunstdünger Patent Verwertungs A. G., Glarus, Switzerland Application December 18, 1934, Serial No. 758,093 In Germany December 23, 1933

11 Claims. (Cl. 23—102)

This invention relates to the making of commercial fertilizers. More particularly it is concerned with producing phosphoric acid in a form available for fertilizer purposes, (such as dicalcium phosphate) and alkali salts. Heretofore the usual method of producing phosphoric acid has been to treat phosphate rock with sulphuric acid in order to liberate the phosphoric acid. From this reaction calcium sulphate is obtained which is a waste product or sometimes may be used as a filler for superphosphate. This calcium sulphate has in most cases little or no value and the sulphuric acid used in these processes is consequently lost.

In contradistinction thereto this invention proposes to substitute for the sulphuric acid the use of nitric acid. When nitric acid is used for reacting with the phosphate rock, the solution obtained can be treated in different ways so that the $P_2O_5$ is precipitated as dicalcium phosphate and a solution of calcium nitrate or a mixture of calcium nitrate with alkali- or ammonium nitrate is obtained. This method has the advantage that the calcium nitrate may be converted by the addition of an alkali carbonate or bi-carbonate into valuable alkali-nitrates and the by-product precipitate of calcium carbonate can be partly reused in the process to precipitate the $P_2O_5$. A further advantage realized in this case is that the acid used for converting the $P_2O_5$ into available form is not lost but recovered as valuable nitrates, which in large amounts can be utilized for fertilizer purposes. A still further advantage of the process of this invention is that it offers an opportunity of obtaining a highly available phosphate precipitate free of excess calcium carbonate while at the same time essentially removing the $P_2O_5$ from the obtained nitrate solution. That is, the phosphate precipitation can be carried out in two stages; in the primary of which there is used calcium carbonate in deficiency of the amount needed for complete precipitation of the $P_2O_5$ in the solution as dicalcium phosphate resulting in a slightly acid end product solution and in the secondary stage there is effected a secondary precipitation using an excess of calcium carbonate precipitant which results in the formation of a phosphatic precipitate and a solution substantially free of $P_2O_5$. This two stage operation of the phosphate precipitation is commercially attractive because the secondary precipitate can be redissolved in the acid solution being fed to the primary precipitation stage.

It is obvious that in such a method the dicalcium phosphate must be produced in such a form that it can easily be separated from the nitrate solution utilizing a minimum of washwater so that a fairly concentrated nitrate solution is obtained and also a dicalcium phosphate practically free from nitrate and with a minimum amount of adherent moisture as otherwise the evaporation and drying costs will be so high that the process will be uneconomical.

However in carrying out such a nitric acid using process difficulties are experienced caused by the impurities, especially the fluorine, usually present in phosphate rocks. Most phosphate rocks contain an amount of fluorine equal to about $\frac{1}{10}$ of the amount of $P_2O_5$ present in the rock and during the precipitation of the dicalcium phosphate this fluorine is precipitated as a very slimy calcium fluoride extremely difficult to separate from the nitrate solution.

When working according to the present invention, however, the phosphate rock is dissolved in the acid in the presence of a fairly large amount of silica and at the same time an alkali salt, as e. g. alkali nitrate or -chloride is added to the reaction mixture. Thereupon the fluorine reacts with the silica and the alkali salt giving an insoluble, well crystallized alkali silicofluoride which can easily be separated from the solution of nitrates and phosphoric acid. From the remaining fluorine-free solution, dicalcium phosphate can then be precipitated by neutralizing the acid solution.

In order to obtain a sufficiently good extraction of the phosphate rock it is necessary to use so much $HNO_3$ for the dissolving or reaction that the $P_2O_5$ is present in the solution practically as free acid. The alkali silicofluoride is consequently precipitated in a strongly acid solution and must be separated from the solution before it is neutralized as otherwise the silicofluoride will be decomposed and converted into very slimy precipitates of calcium fluoride and hydrosilicic acid. In order to obtain as complete a precipitation of the silicofluoride as possible it is necessary to add a large excess preferably 5 to 15 times the theoretical amount of alkali salt.

Phosphate rock however also contains other impurities which play an important part in the production of dicalcium phosphate. Such impurities include iron- and aluminum oxides which are dissolved by the treatment with nitric acid and are then precipitated together with the dicalcium phosphate. Precipitated under ordinary conditions the iron- and aluminum phospates form a voluminous and slimy precipitate, but when the precipitation takes place at a temperature above 70° C. an excellent precipitate is obtained, if the concentration of the solution is not too low.

As it is thus desirable to carry out the precipitation at a temperature above 70° C., the dicalcium phosphate obtained is in anhydrous form. If the acid solution is neutralized directly with alkali- or alkali bicarbonate the dicalcium phosphate will be obtained in too finely divided form and as a result the separation of the precipitate and the solution will be very difficult and it will be necessary to use such large amounts of wash water that the nitrate solution will be highly diluted and the dicalcium phosphate after the washing will have a high content of adherent moisture.

Accordingly by this invention, the precipitation is carried out with calcium carbonate whereby larger and more compact grains of dicalcium phosphate are obtained. The size of the calcium carbonate grains thus used determines or controls the size of the produced dicalcium phosphate grains and the preferable diameter of the calcium carbonate grains is between 40–200$\mu$. If the grains are larger than 200$\mu$ the dissolution of the carbonate will be too slow and incomplete, and if the grains are smaller than approximately 40$\mu$ the produced dicalcium phosphate will be too fine for satisfactory filtering and washing.

In order to obtain a complete precipitation of substantially all the $P_2O_5$ in the solution, it would be necessary to use an excess of calcium carbonate and the produced dicalcium phosphate would then contain a fairly large amount of $CaCO_3$ which is undesirable. The precipitation of the dicalcium phosphate is carried out most desirably in continuous operation in two precipitation stages. In the primary stage precipitation is effected in a slightly acid solution so that the added $CaCO_3$ is completely dissolved. After the dicalcium phosphate has been separated, the $P_2O_5$ in the remaining solution is completely precipitated in a secondary precipitation stage by adding an excess of calcium- or alkali-carbonate, such reagent being referred to in the claims as alkali carbonate and the precipitate after separation of the main part of the solution is then mixed with the phosphoric acid containing solution after the alkali silicofluoride separation. Thus the excess carbonate is decomposed but only part of the dicalcium phosphate is dissolved and when working in this stepwise way the total $P_2O_5$ is produced as carbonate-free dicalcium phosphate.

The invention can be most advantageously utilized in the following process:

Phosphate rock is dissolved in or reacted with 50% nitric acid with addition of so much sodium nitrate solution (approximately 40% $NaNO_3$ strength) that the produced solution contains 10 to 15% $NaNO_3$. The precipitated $Na_2SiF_6$ and the insoluble parts of the rock are then filtered off. This filtration is facilitated, if the phosphate rock has been freed from organic products by calcination. If a phosphate rock high in silica as for instance Florida pebble is used, no extra silica is necessary, but otherwise silica in the form of finely ground sand, quartz or other silica containing material must be added. The clear solution is then in continuous operation brought to react with $CaCO_3$ at a temperature of 75–80° C. so that a constant acidity of 0.2–0.3% $P_2O_5$ is kept in the produced solution. If ground limestone is used, it should all pass through a sieve with 1500 to 1600 mesh per square centimeter. The $CaCO_3$ should be repulped in $NaNO_3$ solution before addition. The produced $CaHPO_4$ settles rapidly and can easily be separated and washed free from adherent solution. A good precipitate from this primary stage precipitation should not contain more than 30%, preferably 20 to 25% adherent moisture and the solubility in ammonium citrate solution should be at least 95%. The remaining solution still contains a small amount of $P_2O_5$ substantially all of which can be precipitated in the secondary precipitation stage by the addition of excess calcium carbonate. This precipitate is separated from the calcium- and sodium nitrate solution by thickening and the thickened sludge returned and mixed with the acid solution before the primary precipitation of $CaHPO_4$.

The mixed $Ca(NO_3)_2,NaNO_3$-solution can be completely or partly converted to sodium nitrate solution by precipitating the lime with $Na_2CO_3$ and the produced $CaCO_3$ can then be used for neutralizing the acid solution. In order to obtain this $CaCO_3$-precipitate in a form suitable for the precipitation of $CaHPO_4$ and easy to separate from the sodium nitrate solution the sodium carbonate is dissolved in so large an amount of unseparated reaction products consisting of $CaCO_3$ and approximately 40% $NaNO_3$ solution from a previous operation of this step that the mixture initially contains 2–4% $Na_2CO_3$ whereupon this mixture and the $Ca(NO_3)_2$—$NaNO_3$ solution are brought to react in continuous operation so that the solution contains approximately 0.1% $Na_2CO_3$ after the lime has been precipitated. The size of the obtained $CaCO_3$ grains can be varied by varying the amount of unseparated reaction products used for dissolving the $Na_2CO_3$ and also by varying the retention time in the precipitation agitator. A portion of the $CaCO_3$ corresponding approximately to the difference in calcium content between tri- and dicalcium carbonate must be washed and removed from the process and either sent to waste or otherwise utilized. The bulk of the calcium carbonate is recirculated for precipitation of the dicalcium phosphate. The portion of the $CaCO_3$ used for precipitating the $CaHPO_4$ should not be separated from the sodium nitrate solution but be utilized suspended therein in the form of a more or less thickened sludge or slurry.

When working according to above description it is possible to produce a washed dicalcium phosphate with less than 25% adherent moisture and a final sodium nitrate solution of at least 40% concentration.

It should be observed that when potassium nitrate for instance is used instead of sodium nitrate, the temperature at which $CaHPO_4$ is precipitated must be considerably increased up to 90–100° C. as at lower temperature the precipitate becomes very slimy.

The invention is not limited to the process of producing alkali nitrates and dicalcium phosphate from nitric acid, phosphate rock and alkali carbonate, but also refers to the production of calcium nitrate and alkali nitrate, either separately or as a mixture. It also refers to the method of dissolving phosphate rock in hydrochloric acid (instead of in nitric acid) in presence of alkali salts as for instance potassium chloride, precipitating the lime with ammonium carbonate in the finally obtained $CaCl_2$—$KCl$ solution. The $NH_4Cl$—$KCl$ solution can then be evaporated for producing a mixed fertilizer or the salts can be separated in any known manner.

It is understood that in all cases where alkali carbonate is recommended for use also alkali bicarbonate can be used.

The invention is further explained in the following diagram and example:

(a) In an acid proof agitator calcined Florida pebble phosphate containing 36% $P_2O_5$ and 51% CaO is treated with nitric acid (50%) in presence of sodium nitrate solution. The amounts are as follows: 1000 grams rock, 2240 grams nitric acid, 1300 grams sodium nitrate solution (40%) as produced by this method. Due to the reaction heat the temperature of the mixture rises to between 40 and 50° C. After two hours the reaction is finished and the solution containing calcium nitrate, phosphoric acid, and sodium nitrate is separated from the insolubles and the sodium silico fluoride precipitate.

(b) The filtrate with about 8% $P_2O_5$ is now mixed with the so called rest precipitate—obtained under d—consisting of a mixture of dicalcium phosphate and calcium carbonate; it is added in form of an unwashed filter cake. Amounts: 1000 grams filtrate and 70 to 80 grams filter cake. The temperature is kept at 70° C., whereby the calcium carbonate is completely dissolved but the main part of the dicalcium phosphate remains undissolved.

(c) To this mixture calcium carbonate is added in order to precipitate the $P_2O_5$ as $CaHPO_4$. Before adding, the $CaCO_3$ is repulped and so suspended in 40% $NaNO_3$ solution and the corresponding amount of wash water. The reaction takes place between 75 and 80° C. The amounts used are as follows: sludge or slurry from b corresponding to 1000 grams filtrate a+70–80 grams secondary precipitate, 111 grams calcium carbonate filter cake (about 80 grams $CaCO_3$) sludged or suspended in 700 grams 30% $NaNO_3$ solution. When working according to these figures, the final solution contains 0.2 to 0.3% free $P_2O_5$. After some hours the reaction is completed and the dicalcium phosphate obtained is filtered, washed, and dried at 100° C. The adherent moisture of the cake is about 26%. The final product has 47 to 48% $P_2O_5$, of which 95% is soluble in neutral ammonium nitrate solution.

(d) The filtrate from c is mixed with the wash water and the remaining $P_2O_5$ is completely precipitated by further addition of $CaCO_3$. To 1000 grams filtrate + wash water (specific gravity about 1.35) 20–30 grams calcium carbonate cake are added. The cake is obtained as described under e and repulped in a few cubic centimeters of sodium nitrate solution. The conditions are the same as under c. The precipitate is separated from the mother liquor consisting of a mixture of calcium nitrate and sodium nitrate by filtration. The filter cake is returned to the acid solution as mentioned above.

(e) The filtrate from d contains 6 to 7% CaO, which is precipitated with calcined soda in a series of agitators: In the first agitator of the series the soda is mixed with such an amount of unseparated recirculated sludge or slurry that a 3 to 4% solution is obtained. In the second agitator of the series the reaction with the calcium nitrate-sodium nitrate solution is carried out at 50° C. The overflow from the last agitator is recirculated as described. The amounts are as follows: 420 grams soda are dissolved in 15 liters sludge and this mixture is brought to react continuously with 3400 grams calcium nitrate-sodium nitrate solution (6.:= CaO). The finished sodium nitrate solution has an excess of from 0.05 to 0.09% $Na_2CO_3$. The calcium carbonate is filtered off and the unwashed filter cake contains about 73% $CaCO_3$. The completely washed dry cake has only 0.18% $P_2O_5$. The sodium nitrate solution produced contains 40% $NaNO_3$ and is practically free of $P_2O_5$.

The calcium carbonate and the sodium nitrate solution is used under a, c, d as already described.

I claim:

1. The method of producing dicalcium phosphate and sodium nitrate from phosphate rock which comprises reacting the phosphate rock with nitric acid; in a primary stage, adding to the solution formed thereby calcium carbonate of controlled size suspended in alkali metal nitrate solution both produced in the process, at an elevated temperature, and in deficiency of the amount needed for complete precipitation of the $P_2O_5$ in the solution as dicalcium phosphate; separating the so-produced dicalcium phosphate from the solution; in a secondary stage, adding to the separated solution calcium carbonate produced in the process, in excess of the amount needed to precipitate the $P_2O_5$ therein as dicalcium phosphate; separating the so-produced phosphatic precipitate from the solution and returning it to the primary stage of the process; adding to said last-mentioned solution alkali metal carbonate dissolved in unseparated reaction products from a previous operation of this step, whereby a mixture is formed containing alkali metal carbonate and alkali metal nitrate from which a precipitate is formed comprising calcium carbonate of controlled size suspended in the final solution of alkali metal nitrate; separating therefrom the alkali nitrate solution and calcium carbonate in excess of those amounts needed in the previous steps of the process; and returning the remaining slurry of calcium carbonate in alkali nitrate to the primary and secondary calcium phosphate precipitation stages of the process in accordance with the steps outlined.

2. The method of producing dicalcium phosphate and sodium nitrate from phosphate rock containing fluorine which comprises reacting the phosphate rock with nitric acid in the presence of sufficient silica for precipitating as silicofluoride substantially all of the fluorine present in rock in the presence of an excess of alkali metal nitrate produced in the process; separating the so-produced silicofluoride from the obtained solution; in a primary stage, adding to the solution calcium carbonate of controlled size suspended in alkali metal nitrate solution both produced in the process, at an elevated temperature, and in deficiency of the amount needed for complete precipitation of the $P_2O_5$ in the solution as dicalcium phosphate; separating the so-produced dicalcium phosphate from the solution; in a secondary stage, adding to the separated solution calcium carbonate produced in the process, in excess of the amount needed to precipitate the $P_2O_5$ therein as dicalcium phosphate; separating the so-produced phosphatic precipitate from the solution and returning it to the primary stage of the process; adding to said last-mentioned solution alkali metal carbonate dissolved in unseparated reaction products from a previous operation of this step whereby a mixture is formed containing alkali metal carbonate and alkali metal nitrate from which a precipitate is formed comprising calcium carbonate of controlled size suspended in the final solution of alkali metal nitrate; separating therefrom alkali metal nitrate solution and calcium carbonate in excess of those amounts needed in the previous steps of the process; returning the remaining slurry of calcium carbonate in alkali metal nitrate to the primary and secondary calcium phosphate precipitation stages of the process in accordance with the steps outlined; and returning a part of the alkali metal nitrate to the initial phosphate rock-nitric acid reaction.

3. The method of producing dicalcium phosphate and sodium nitrate from phosphate rock which comprises reacting the phosphate rock with nitric acid; in a primary stage, adding to the solution formed thereby calcium carbonate of controlled size suspended in alkali metal nitrate solution both produced in the process, at an elevated temperature, and in deficiency of the amount needed for complete precipitation of the $P_2O_5$ in the solution as dicalcium phosphate; separating the so-produced dicalcium phosphate from the solution; in a secondary stage, adding to the separated solution a suitable alkali carbonate in excess of the amount needed to precipitate the $P_2O_5$ therein as dicalcium phosphate; separating the so-produced phosphatic precipitate from the solution and returning it to the primary stage of the process; adding to said last-mentioned solution alkali metal carbonate dissolved in unseparated reaction products from a previous operation of this step whereby a mixture is formed containing alkali metal carbonate and alkali metal nitrate from which a precipitate is formed comprising calcium carbonate of controlled size suspended in the final solution of alkali metal nitrate; separating therefrom the alkali metal nitrate solution and calcium carbonate in excess of those amounts needed in the previous steps of the process; and returning the remaining slurry of calcium carbonate in alkali metal nitrate to the primary and secondary calcium phosphate precipitation stages of the process in accordance with the steps outlined.

4. The method of producing dicalcium phosphate and sodium nitrate from phosphate rock containing fluorine which comprises reacting the phosphate rock with nitric acid in the presence of sufficient silica for precipitating as silicofluoride substantially all of the fluorine present in the rock in the presence of an excess of alkali metal nitrate produced in the process; separating the so-produced silicofluoride from the obtained solution; in a primary stage, adding to the solution calcium carbonate of controlled size suspended in alkali metal nitrate solution both produced in the process, at an elevated temperature, and in deficiency of the amount needed for complete precipitation of the $P_2O_5$ in the solution as dicalcium phosphate; separating the so-produced dicalcium phosphate from the solution; in a secondary stage, adding to the separated solution a suitable alkali carbonate in excess of the amount needed to precipitate the $P_2O_5$ therein as dicalcium phosphate; separating the so-produced phosphatic precipitate from the solution and returning it to the primary stage of the process; adding to said last-mentioned solution alkali metal carbonate dissolved in unseparated reaction products from a previous operation of this step whereby a mixture is formed containing alkali metal carbonate and alkali metal nitrate from which a precipitate is formed comprising calcium carbonate of controlled size suspended in the final solution of alkali metal nitrate; separating therefrom the alkali metal nitrate solution and calcium carbonate in excess of those amounts needed in the previous steps of the process; returning the remaining slurry of calcium carbonate in alkali metal nitrate to the primary and secondary calcium phosphate precipitation stages of the process in accordance with the steps outlined; and returning a part of the alkali metal nitrate to the initial phosphate rock-nitric acid reaction.

5. The method of producing dicalcium phosphate and sodium nitrate from phosphate rock containing fluorine which comprises reacting the phosphate rock with nitric acid in the presence of sufficient silica for precipitating as silicofluoride substantially all of the fluorine present in the rock in the presence of an excess of around 10% to 15% of alkali metal nitrate produced in the process; separating the so-produced silicofluoride from the obtained solution; in a primary stage, adding to the solution calcium carbonate of controlled size suspended in alkali metal nitrate solution both produced in the process, at an elevated temperature, and in deficiency of the amount needed for complete precipitation of the $P_2O_5$ in the solution as dicalcium phosphate; separating the so-produced dicalcium phosphate from the solution; in a secondary stage, adding to the separated solution calcium carbonate produced in the process, in excess of the amount needed to precipitate the $P_2O_5$ therein as dicalcium phosphate; separating the so-produced phosphatic precipitate from the solution and returning it to the primary stage of the process; adding to said last-mentioned solution alkali metal carbonate dissolved in unseparated reaction products from a previous operation of this step whereby a mixture is formed containing alkali metal carbonate and alkali metal nitrate from which a precipitate is formed comprising calcium carbonate of controlled size in the final solution of alkali metal nitrate; separating therefrom the alkali metal nitrate solution and calcium carbonate in excess of those amounts needed in the previous steps of the process; returning the remaining slurry of calcium carbonate in alkali metal nitrate to the primary and secondary calcium phosphate precipitation stages of the process as needed; and returning a part of the alkali metal nitrate to the initial phosphate rock-nitric acid reaction.

6. The method of producing dicalcium phosphate and sodium nitrate from phosphate rock which comprises reacting the phosphate rock with nitric acid; in a primary stage, adding to the solution formed thereby calcium carbonate of controlled size suspended in alkali metal nitrate solution both produced in the process, at a temperature between 70° C. and the boiling point of the solution, and in deficiency of the amount needed for complete precipitation of the $P_2O_5$ in the solution as dicalcium phosphate; separating the so-produced dicalcium phosphate from the solution; in a secondary stage, adding to the separated solution calcium carbonate produced in the process, in excess of the amount needed to precipitate the $P_2O_5$ therein as dicalcium phosphate; separating the so-produced phosphatic precipitate from the solution and returning it to the primary stage of the process; adding to said last-mentioned solution alkali metal carbonate dissolved in unseparated reaction products from a previous operation of this step whereby a mixture is formed containing alkali metal carbonate and alkali metal nitrate from which a precipitate is formed comprising calcium carbonate of controlled size suspended in the final solution of alkali metal nitrate; separating therefrom the alkali metal nitrate solution and calcium carbonate in excess of those amounts needed in the previous steps of the process; and returning the remaining slurry of calcium carbonate in alkali metal nitrate to the primary and secondary calcium phosphate precipitation stages of the process as needed.

7. The method of producing dicalcium phosphate and sodium nitrate from phosphate rock containing fluorine which comprises reacting the phosphate rock with nitric acid in the presence of sufficient silica for precipitating as silicofluoride substantially all of the fluorine present in the rock in the presence of an excess of alkali metal nitrate produced in the process; separating the so-produced silicofluoride from the obtained solution; in a primary stage, adding to the solution calcium carbonate of controlled size suspended in alkali metal nitrate solution both produced in the process, at a temperature between 70° C. and the boiling point of the solution, and in deficiency of the amount needed for complete precipitation of the $P_2O_5$ in the solution as dicalcium phosphate; separating the so-produced dicalcium phosphate from the solution; in a secondary stage, adding to the separated solution calcium carbonate produced in the process, in excess of the amount needed to precipitate the $P_2O_5$ therein as dicalcium phosphate; separating the so-produced phosphatic precipitate from the solution and returning it to the primary stage of the process; adding to said last-mentioned solution alkali metal carbonate dissolved in unseparated reaction products from a previous operation of this step whereby a mixture is formed containing alkali metal carbonate and alkali metal nitrate from which a precipitate is formed comprising calcium carbonate of controlled size suspended in the final solution of alkali metal nitrate; separating therefrom the alkali metal nitrate solution and calcium carbonate in excess of those amounts needed in the previous steps of the process; returning the remaining slurry of calcium carbonate in alkali metal nitrate to the primary and secondary calcium phosphate precipitation stages of the process as needed; and returning a part of the alkali metal nitrate to the initial phosphate rock-nitric acid reaction.

8. The method of producing dicalcium phosphate and sodium nitrate from phosphate rock which comprises reacting the phosphate rock with nitric acid; in a primary stage, adding to the solution formed thereby calcium carbonate of controlled size suspended in alkali metal nitrate solution both produced in the process, at a temperature between 70° C. and the boiling point of the solution, and in deficiency of the amount needed for complete precipitation of the $P_2O_5$ in the solution as dicalcium phosphate; separating the so-produced dicalcium phosphate from the solution; in a secondary stage, adding to the separated solution a suitable alkali carbonate in excess of the amount needed to precipitate the $P_2O_5$ therein as dicalcium phosphate; separating the so-produced phosphatic precipitate from the solution and returning it to the primary stage of the process; adding to said last-mentioned solution alkali metal carbonate dissolved in unseparated reaction products from a previous operation of this step whereby a mixture is formed containing alkali metal carbonate and alkali metal nitrate from which a precipitate is formed comprising calcium carbonate of controlled size suspended in the final solution of alkali metal nitrate; separating therefrom the alkali metal nitrate solution and calcium carbonate in excess of those amounts needed in the previous steps of the process; returning the remaining slurry of calcium carbonate in alkali metal nitrate to the primary and secondary calcium phosphate precipitation stages of the process as needed.

9. The method of producing dicalcium phosphate and sodium nitrate from phosphate rock containing fluorine which comprises reacting the phosphate rock with nitric acid in the presence of sufficient silica for precipitating as silicofluoride substantially all of the fluorine present in the rock in the presence of an excess of alkali metal nitrate produced in the process; separating the so-produced silicofluoride from the obtained solution; in a primary stage adding to the solution calcium carbonate of controlled size suspended in alkali metal nitrate solution both produced in the process, at a temperature between 70° C. and the boiling point of the solution, and in deficiency of the amount needed for complete precipitation of the $P_2O_5$ in the solution as dicalcium phosphate; separating the so-produced dicalcium phosphate from the solution; in a secondary stage, adding to the separated solution a suitable alkali carbonate in excess of the amount needed to precipitate the $P_2O_5$ therein as dicalcium phosphate; separating the so-produced phosphatic precipitate from the solution and returning it to the primary stage of the process; adding to said last-mentioned solution alkali metal carbonate dissolved in unseparated reaction products from a previous operation of this step whereby a mixture is formed containing alkali metal carbonate and alkali metal nitrate from which a precipitate is formed comprising calcium carbonate of controlled size suspended in the final solution of alkali metal nitrate, separating therefrom the alkali metal nitrate solution and calcium carbonate in excess of those amounts needed in the previous steps of the process; returning the remaining slurry of calcium carbonate in alkali metal nitrate to the primary and secondary calcium phosphate precipitation stages of the process as needed; and returning a part of the alkali metal nitrate to the initial phosphate rock-nitric acid reaction.

10. In a process for the production of dicalcium phosphate wherein the dissolved $P_2O_5$ is precipitated as substantially dicalcium phosphate by the addition of calcium carbonate to a phosphate solution, the step of reacting with a substantially phosphate-free solution of calcium nitrate formed in the process, an alkali metal carbonate mixed with unseparated reaction products consisting of calcium carbonate and an alkali metal nitrate solution wherein the solution contains alkali metal carbonate and alkali metal nitrate, and returning part of the so-formed calcium carbonate for the precipitation of the dicalcium phosphate.

11. In a process for the production of dicalcium phosphate wherein the dissolved $P_2O_5$ is precipitated as substantially dicalcium phosphate by the addition of calcium carbonate to a phosphate solution, the step of reacting with a substantially phosphate-free solution of calcium nitrate formed in the process, an alkali metal carbonate mixed with unseparated reaction products consisting of calcium carbonate and an alkali metal nitrate solution wherein the solution contains alkali metal carbonate and alkali metal nitrate and the salt solution after the precipitation has taken place contains an excess of substantially 0.1% of dissolved alkali metal carbonate, and returning part of the so-formed calcium carbonate for the precipitation of dicalcium phosphate.

MARKUS LARSSON.